A. J. BROWN.
GAGE.
APPLICATION FILED AUG. 23, 1911.
1,216,544.
Patented Feb. 20, 1917.
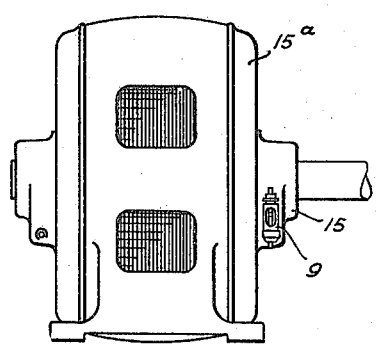
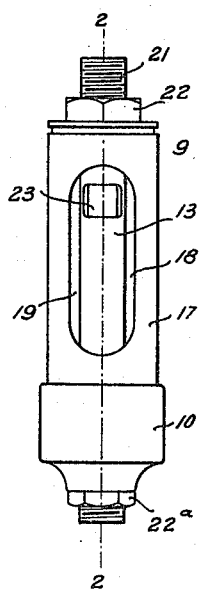
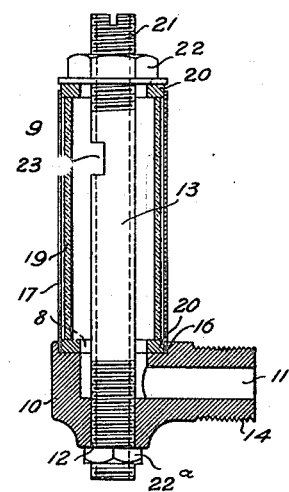
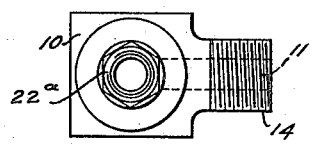
Witnesses
Rob. E. Stoll.
Chas. L. Byron
Inventor
Arthur J. Brown
By Chas. E. Lord
Attorney

UNITED STATES PATENT OFFICE.

ARTHUR J. BROWN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

GAGE.

1,216,544.   Specification of Letters Patent.   Patented Feb. 20, 1917.

Application filed August 23, 1911. Serial No. 645,503.

*To all whom it may concern:*

Be it known that I, ARTHUR J. BROWN, a citizen of the United States, residing at Milwaukee, in the county of Milwaukee and State of Wisconsin, have invented certain new and useful Improvements in Gages, of which the following is a full, clear, and exact specification.

This invention relates to gages.

In the operation of dynamo-electric machines, it is found that oil in the bearings of such machines is sometimes caused to be sucked or drawn out of the bearings due to the action of the rotating member. The oil leakage caused in this manner is greatly increased if the oil in the bearing housings exceeds a certain predetermined amount. The results occasioned by the oil thus drawn out and splashed, in some instances on conducting parts of the machine, prove to be troublesome if not dangerous.

It is therefore the object of my invention to obviate the above-mentioned undesirable drawing or sucking out of the oil and the splashing occurring therefrom.

This object is accomplished by providing a novel gage, which indicates at all times the level of the liquid in the bearing housings of the dynamo-electric machine or any other receptacle to which the gage may be attached, and which is provided with means to permit the overflow of oil through a part of the gage.

The various novel features of my invention will be apparent from the description and drawings, and will be particularly set forth in the appended claims.

The invention is illustrated on the accompanying sheet of drawings, in which Figure 1 is a front elevation of my gage provided with the overflow;

Fig. 2 is a sectional view of the same gage taken along the line 2—2 of Fig. 1;

Fig. 3 is a bottom plan view of the gage; and,

Fig. 4 is a front elevation of a dynamo-electric machine, one of the bearings of which is provided with my gage.

The gage and overflow 9 includes a member 10 having three apertures, 8, 11, and 12, the latter of which is tapped and adapted to receive one end of an outlet and overflow tube 13, both ends of which are threaded. The member 10, which is preferably a casting or of bar stock, is provided with a threaded portion 14 adapted to be screwed into a bearing housing 15 of a dynamo-electric machine 15$^a$, or any other receptacle to which a gage may be connected for the purpose of indicating the level of the fluid therein and to permit of an overflow. The member 10 is also provided with a recessed portion 16 in which a tube 17, having a long slot 18, fits. Interposed between the tubes 13 and 17 is a sight-glass 19 which is provided for the purpose of making it possible to ascertain the level of the liquid at all times. The ends of the glass tube 19 are provided with flexible washers 20 to prevent outward leakage of the liquid within the gage. The upper end 21 of the tube 13 is provided with a nut 22 for holding the washers in place and maintaining the connection between the different parts of the gage rigid. The lower end of the tube 13 is also provided with a nut 22$^a$ to prevent any leakage through the opening 12 in the member 10. The tube 13 is also provided with an opening 23 through which the overflow oil or liquid within the gage may pass.

Oil from the bearing housing 15 in this particular case passes through the inlet opening 11 and up into the space formed between the tube 13 and sight-glass 19 indicating the level of the liquid within the bearing housing. If for any reason the oil rises to the opening 23 in the tube 13, the oil will overflow and pass down and out through the tube 13 into any receptacle which may be provided for that purpose. The tube 13 is adjustable with respect to and in the member 10 so that the level at which it is desired to cause an overflow may be varied by loosening the nut 22 and adjusting the tube 13 in the member 10, after which the nut 22 may be tightened to render all parts rigid. This adjustable feature is particularly advantageous when it is found, that due to the various speeds of different machines, to which the gage is attached, oil, in the bearing housings is drawn toward and into the rotating elements of the machines. The same gage can be used for machines of any types or speeds and the tube 13 be adjusted to meet the requirements of each particular case. This oil gage and overflow may be used in connection with any receptacle to ascertain the level of the fluid within the receptacle and to provide an overflow for such fluid at any predetermined level, and I do not intend to limit my gage to any particular use or application. I have described it in connection with a dynamo-electric machine merely because it finds there a useful application of particular importance.

There may be various modifications and arrangements of the parts, and I intend in my claims to cover all such modifications and arrangements which do not involve a departure from the spirit and scope of my invention as set forth in the appended claims.

What I claim as new is:

1. A gage adapted to be placed in communication with a receptacle and to indicate at all times the level of fluid in said receptacle, including an inlet member having a recessed portion, an overflow member adjustable in and with respect to said inlet member, a sight glass, and means supported in the recess of said inlet member to support said sight glass.

2. In combination, a receptacle, a gage adapted to indicate the level of fluid in said receptacle, said gage being connected with said receptacle and being adapted to freely communicate therewith at all times, and a device adjustable within said gage to determine the level at which fluid may overflow from said gage.

3. An indicating device adapted to be placed in communication with a fluid-containing receptacle and to indicate any working fluid level therein, comprising a body portion adapted to contain fluid to a level corresponding to any normal level of fluid in said receptacle, and an overflow device operatively connected to the body portion and adjustable relatively thereto, the body portion being provided with means permitting the ascertaining of the level of the fluid within the device.

4. In a gage, a hollow member provided with an inlet portion, a tubular element supported at one end in said hollow member, an overflow member extending through said first member and adjustable relatively thereto and extending into said tubular element, and means engaging said overflow member for closing the other end of the tubular element.

5. In combination with a fluid containing receptacle, a gage for indicating any working level of fluid in said receptacle, said gage including a hollow element adapted to contain fluid to the same level as that of the fluid in said receptacle and having an inlet opening, and a member opening into said hollow member and adjustable relatively thereto to determine the level at which fluid within said element may overflow.

6. In a gage, a hollow member having an inlet portion, a tubular element supported on the upper side of said hollow member and in fluid communication with the interior of said hollow member, an overflow member connected to said hollow member, and means coöperating with said overflow member for securing said tubular member in position.

7. In a gage, a hollow body portion having an inlet, a tubular element supported on said body portion and provided with a transparent part to enable the level of fluid therein to be ascertained; a second tubular element adjustably secured to said body portion and disposed within said first tubular element, the said second tubular element being provided with an opening affording fluid communication between said tubular elements and constituting an overflow from said first tubular element, and means coöperating with said tubular elements for securing the first tubular element to the body portion.

8. In combination with a fluid containing receptacle, a device for indicating any working level of fluid in said receptacle comprising a hollow body portion having an inlet secured to said receptacle, and a tubular element communicating with the interior and exterior of said device and adjustably associated with said body portion for varying the level at which fluid may overflow from said indicating device.

9. In combination with a receptacle, a device for indicating the level of fluid within said receptacle comprising a body member having an inlet portion secured to said receptacle, and means adjustable relatively to said body member and permitting overflow of fluid from said indicating device at any level between a predetermined maximum and minimum.

In testimony whereof I affix my signature, in the presence of two witnesses.

ARTHUR J. BROWN.

Witnesses:
 CHAS. L. BYRON,
 ROB. E. STOLL.

It is hereby certified that in Letters Patent No. 1,216,544, granted February 20, 1917, upon the application of Arthur J. Brown, of Milwaukee, Wisconsin, for an improvement in "Gages," an error appears in the printed specification requiring correction as follows: Page 2, line 59, claim 5, for the word "member" read *element;* and that the said Letters Patent should be read with this correction therein that the same may conform to the record of the case in the Patent Office.

Signed and sealed this 20th day of March, A. D., 1917.

[SEAL.]

F. W. H. CLAY,

*Acting Commissioner of Patents.*

Cl. 73—54.